(12) United States Patent
Duquene et al.

(10) Patent No.: US 8,425,308 B2
(45) Date of Patent: Apr. 23, 2013

(54) COUNTER-BALANCING IN-PLAY VIDEO GAME INCENTIVES/REWARDS BY CREATING A COUNTER-INCENTIVE

(75) Inventors: Joel Duquene, Raleigh, NC (US); Ollie James Hales, Durham, NC (US); Morris Stanley Johnson, Jr., Cary, NC (US); Adrienne Yvette Miller, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/226,571

(22) Filed: Sep. 7, 2011

(65) Prior Publication Data
US 2013/0059666 A1 Mar. 7, 2013

(51) Int. Cl.
A63F 9/24 (2006.01)
A63F 13/00 (2006.01)

(52) U.S. Cl.
USPC ......... 463/23; 463/1; 463/25; 463/29; 463/43

(58) Field of Classification Search ................ 463/1, 25, 463/29, 23, 43
See application file for complete search history.

(56) References Cited

U.S. PATENT DOCUMENTS

| | | | |
|---|---|---|---|
| 6,319,119 B1* | 11/2001 | Konoe et al. | 463/2 |
| 6,629,890 B2* | 10/2003 | Johnson | 463/25 |
| 2002/0132660 A1* | 9/2002 | Taylor | 463/16 |
| 2006/0211493 A1* | 9/2006 | Walker et al. | 463/29 |
| 2009/0011830 A1 | 1/2009 | Wang et al. | 463/29 |
| 2009/0191523 A2* | 7/2009 | Flanagan | 434/236 |

FOREIGN PATENT DOCUMENTS

| | | |
|---|---|---|
| EP | 1208883 | 5/2002 |
| EP | 1522918 | 1/2004 |
| WO | WO2009154313 | 12/2009 |

OTHER PUBLICATIONS

"Stay Focusd," Google Chrome Web Store, Google, May 2011.

* cited by examiner

*Primary Examiner* — Sunit Pandya
*Assistant Examiner* — Jasson Yoo
(74) *Attorney, Agent, or Firm* — VanLeeuwen & VanLeeuwen; Diana R. Gerhardt

(57) ABSTRACT

An approach is provided in which a disincentive is provided during the execution of a video game program that is operated by a current user. One or more disincentive factors are identified that correspond to the current user. The identified disincentive factors are compared with current time factors. Based on the comparison, one or more game characteristics are altered with the game characteristics being altered in order to provide a disincentive to continued operation of the video game program by the current user.

20 Claims, 6 Drawing Sheets

COUNTER-BALANCING IN-PLAY VIDEO GAME INCENTIVES/REWARDS BY CREATING A COUNTER-INCENTIVE

TECHNICAL FIELD

The present disclosure relates to counter-incentives in video games. More particularly, the present disclosure relates to changing game parameters based on thresholds to create counter-incentives to discourage play.

BACKGROUND OF THE INVENTION

Mild video game compulsions or habits may become problematic. This is especially true when a user's game compulsions or habits interfere with productive work or in undertaking essential responsibilities. Current solutions to countering a user's video game compulsion or habit include powering off the video game device, however this solution is effective so long as the user does not have the ability to restore power to the device. Another current solution is password protecting the video game. However this solution is effective so long as the game is capable of being password protected and so long as the user cannot circumvent the protection by learning the password or hacking the system. An additional current solution is game removal where the game is removed from the home or environment, however this solution is effective if the user is willing to completely remove the game. In addition, the above solutions provide binary-type solutions which completely remove the ability to play the video game as the primary solution.

SUMMARY

An approach is provided in which a disincentive is provided during the execution of a video game program that is operated by a current user. One or more disincentive factors are identified that correspond to the current user. The identified disincentive factors are compared with current time factors. Based on the comparison, one or more game characteristics are altered with the game characteristics being altered in order to provide a disincentive to continued operation of the video game program by the current user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
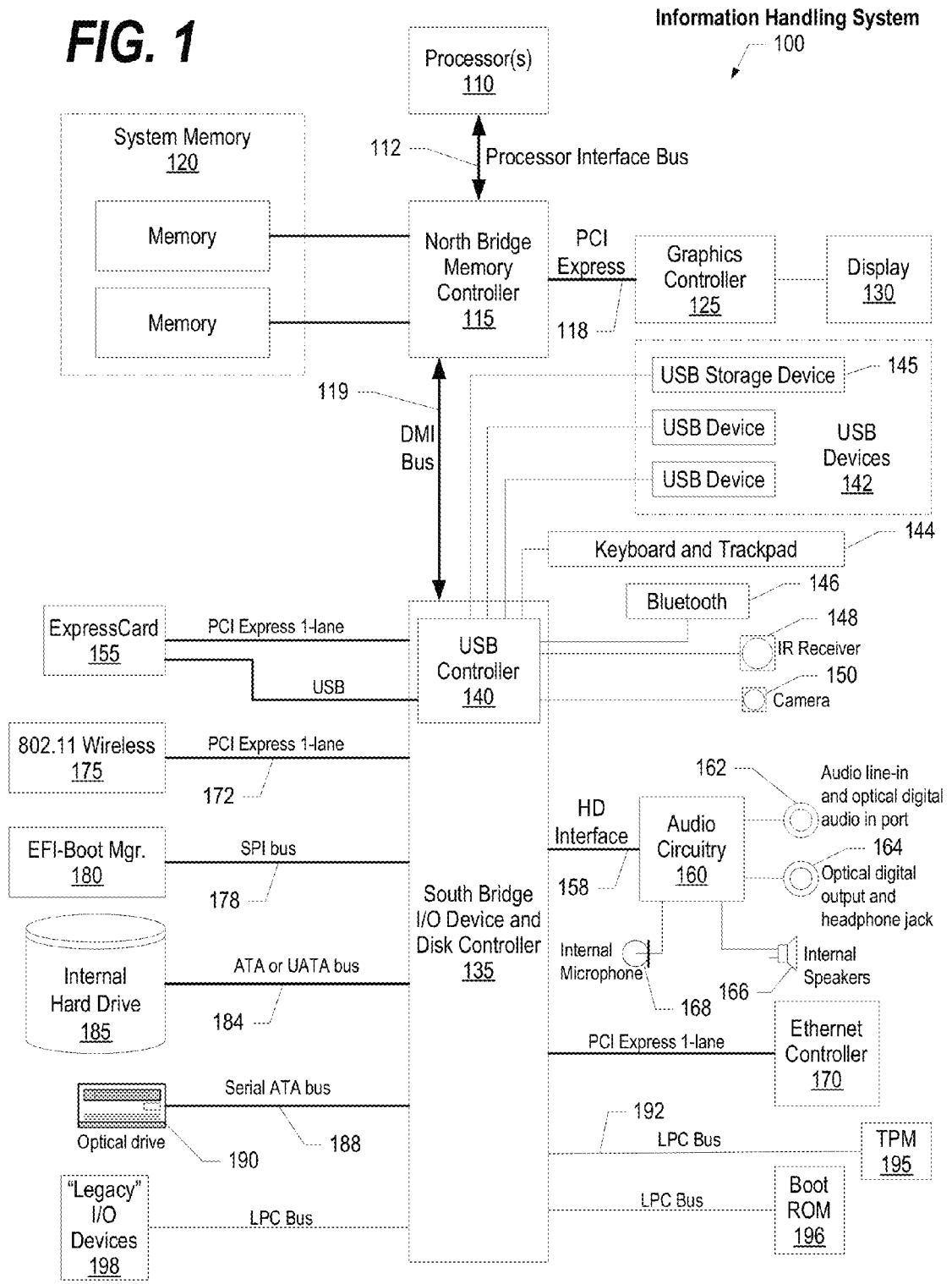
FIG. 1 is a block diagram of a data processing system in which the methods described herein can be implemented.
Figure 2:
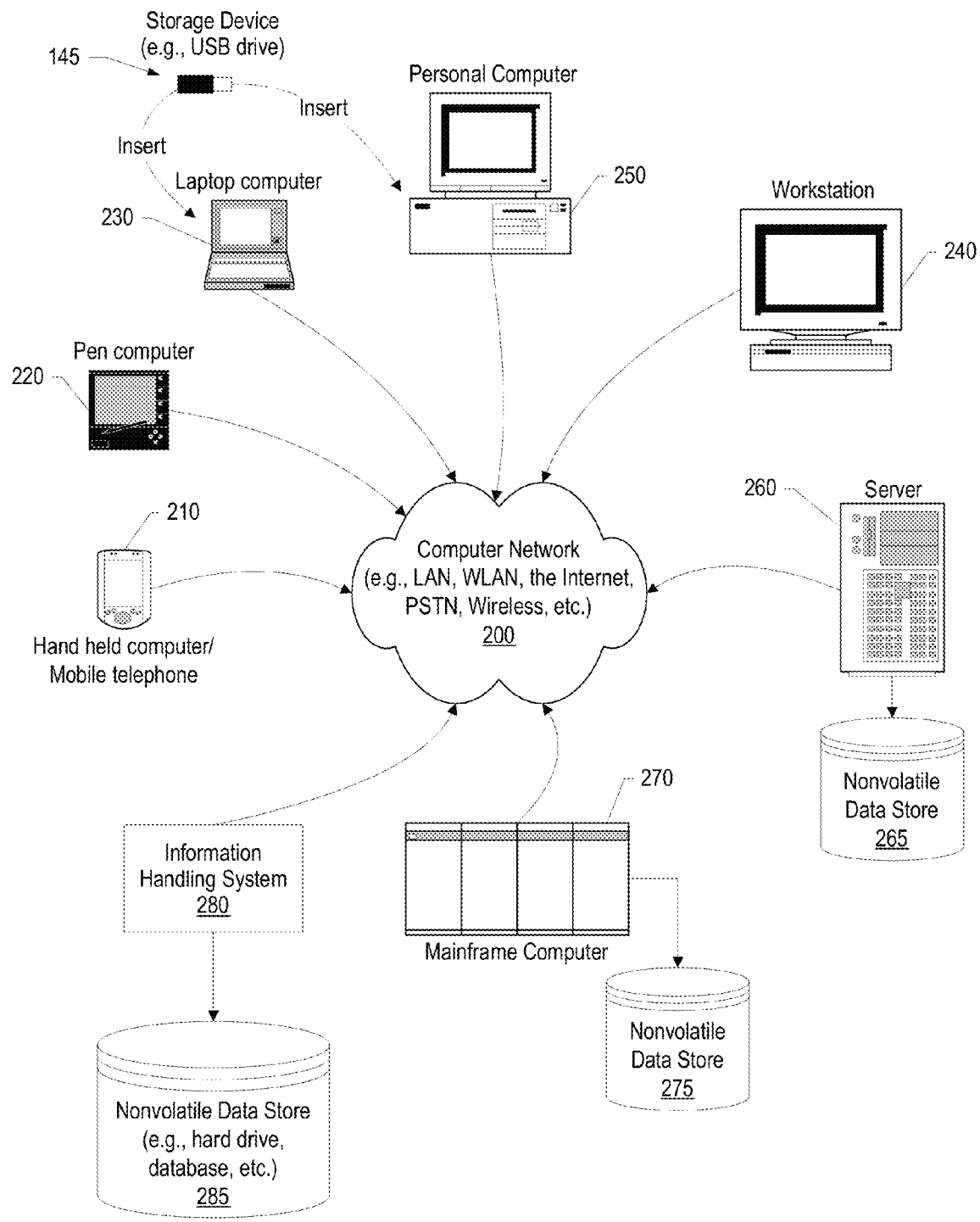
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
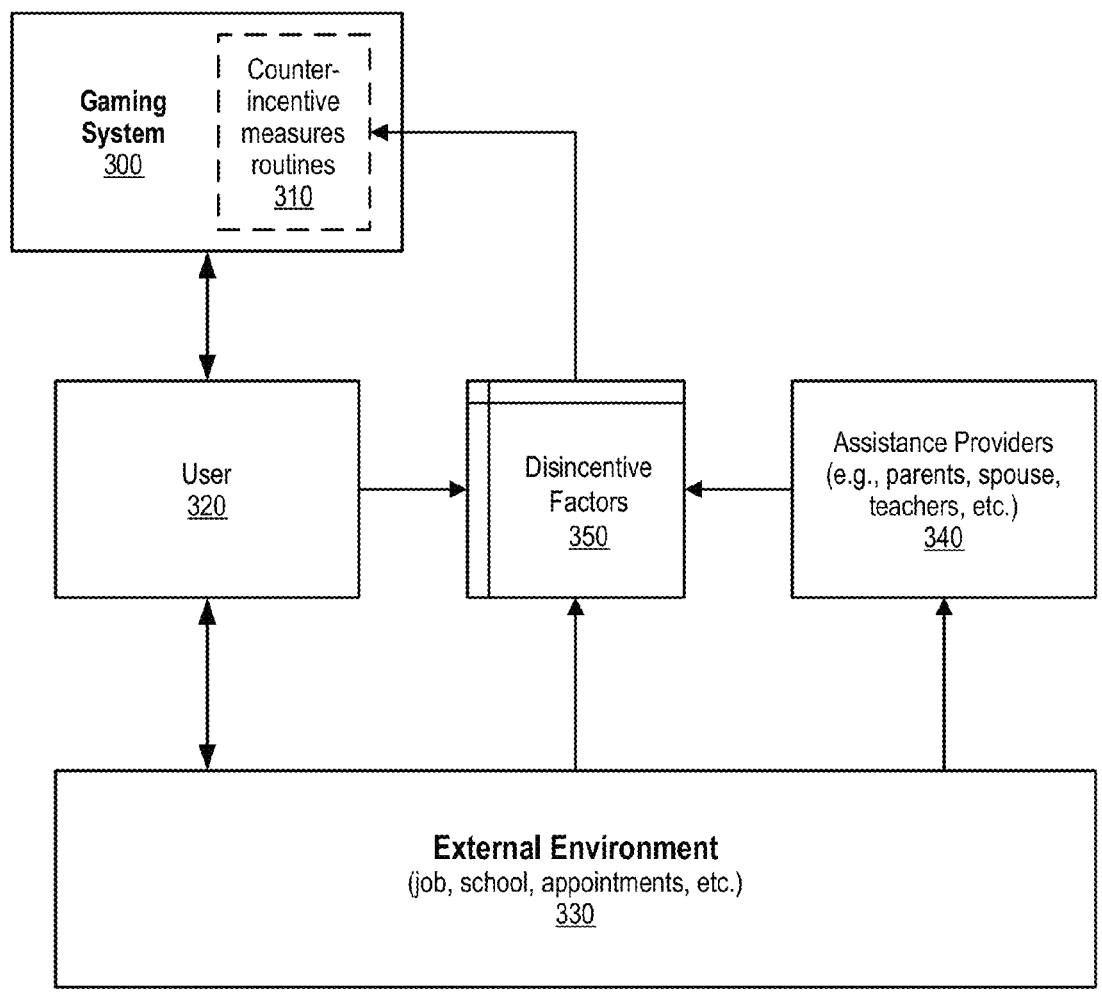
FIG. 3 is a diagram showing various components included in a system that provides counter-balancing during video game operation in order to provide a counter-incentive to further play of the game.

FIG. 3 is a diagram showing various components included in a system that provides counter-balancing during video game operation in order to provide a counter-incentive to further play of the game. Video gaming system 300 is an information handling system such as a stand-alone gaming system, general personal computer system, pervasive communications system (e.g., smart phone, etc.) or any information handling system capable of executing a video game. Gaming system 300 includes counter-incentive measures routines 310 which are processes described herein that provide counter-incentives (e.g., disincentives, etc.) to users in order to aid the user in avoiding video gaming compulsions or habits.

User 320 operates gaming system 300 using any variety of controls such as a gaming controller, keyboard, mouse, etc. User 320 has various interactions with external environment 330 such as employment, school, appointments, and the like. Assistance providers 340 aid the user in setting disincentive factors 350 that are inputs to the counter-incentive measures routines of gaming system 300. Disincentive factors include changes to video game characteristics that are designed to make playing the video game less enjoyable when certain time thresholds occur. For example, in a character-based video game, a disincentive could be established to change characteristics of a main character of the game (e.g., making the character slower, weaker, etc.) when the user has been playing for a particular amount of time (e.g., more than an hour, etc.). In addition, if the user continues playing after the time threshold has occurred, the characteristics continue to be altered the more time that passes (e.g., making the video game character even slower or weaker, etc.) so that the video game becomes frustrating to the user and thus encourages the user to cease playing. The disincentives can be reset when the user has ceased playing for an amount of time. For example, if the disincentives apply after the user has played for one hour in a given day, the disincentives would not be initially present when the user commences play of the video game after having not played the game for a period of time (e.g., if the user has not played in the past day, etc.). In this manner, the user is able to play what is deemed to be a reasonable, non-compulsive or habit-forming amount of time without completely removing the video gaming experience from the user.

Figure 4:
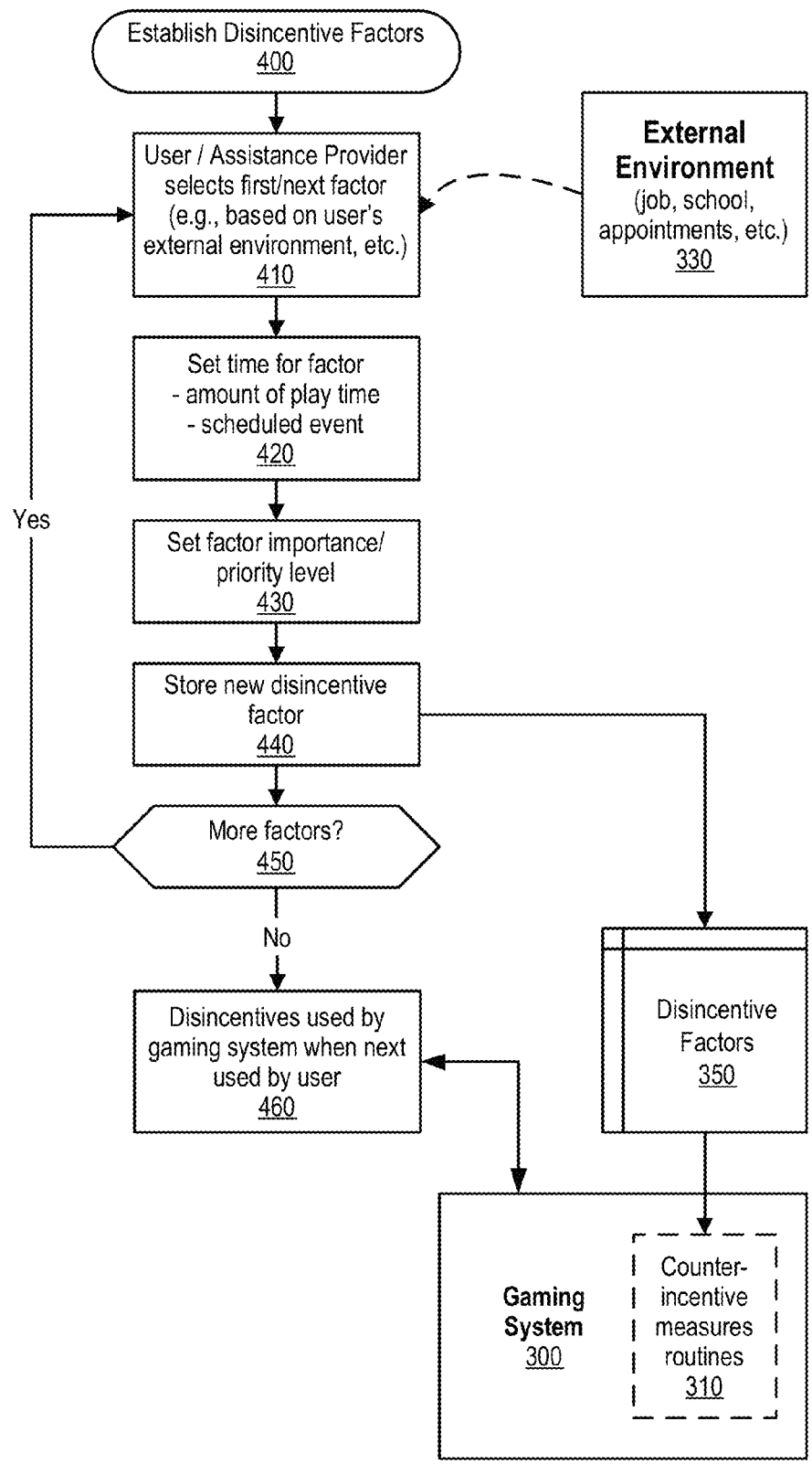
FIG. 4 is a flowchart showing steps taken to establish video game disincentive factors.

FIG. 4 is a flowchart showing steps taken to establish video game disincentive factors. Processing commences at 400 whereupon, at step 410, the process receives a user's selection of a disincentive factor, such as a time limit, time of day limitation, or the like. The disincentive factor may be established by the video game user or may be established by an assistance provider (e.g., parent, etc.). In many cases, the disincentive factor is based on the video game user's external environment 330, such as the user's employment responsibilities, school schedule, appointments, or the like.

At step 420, the user sets a time factor such as a time window during which the user is allowed to play the video game before disincentives are applied, a time allotment (e.g., one hour per day, etc.) that the user is allowed to play before disincentives are applied, or other time based factor. At step 430 the user sets a factor importance (or priority) level. For example, the amount of time that the user plays during a given day (e.g., one hour) may be given a greater importance than the time of day during which the user plays the video game. In one embodiment, the priority level is used to increase or decrease the disincentive. For example, the characteristics of the video game character (e.g., speed, strength, etc.) may decrease dramatically (a higher priority) when the user plays longer than one hour, but may decrease less dramatically when the user plays after a given time of day (e.g., after ten o'clock P.M., etc.). At step 440, the system stores the new disincentive factor in disincentive factors memory area 350. As previously shown in FIG. 3, the disincentive factors stored in data store 350 are read by the video game's counter-incentive measures routines in order to apply disincentives in the video game environment.

A decision is made as to whether the user (user of the game, assistance provider, etc.) wishes to provide additional factors (decision 450). If the user wishes to provide additional factors, then decision 450 branches to the "yes" branch which loops back to receive and store the next set of factor data. This looping continues until the user does not wish to provide further factors, at which point decision 450 branches to the "no" branch. At step 460, the disincentive factors are used by video gaming system 300 when the video game is next played by the user.

Figure 5:
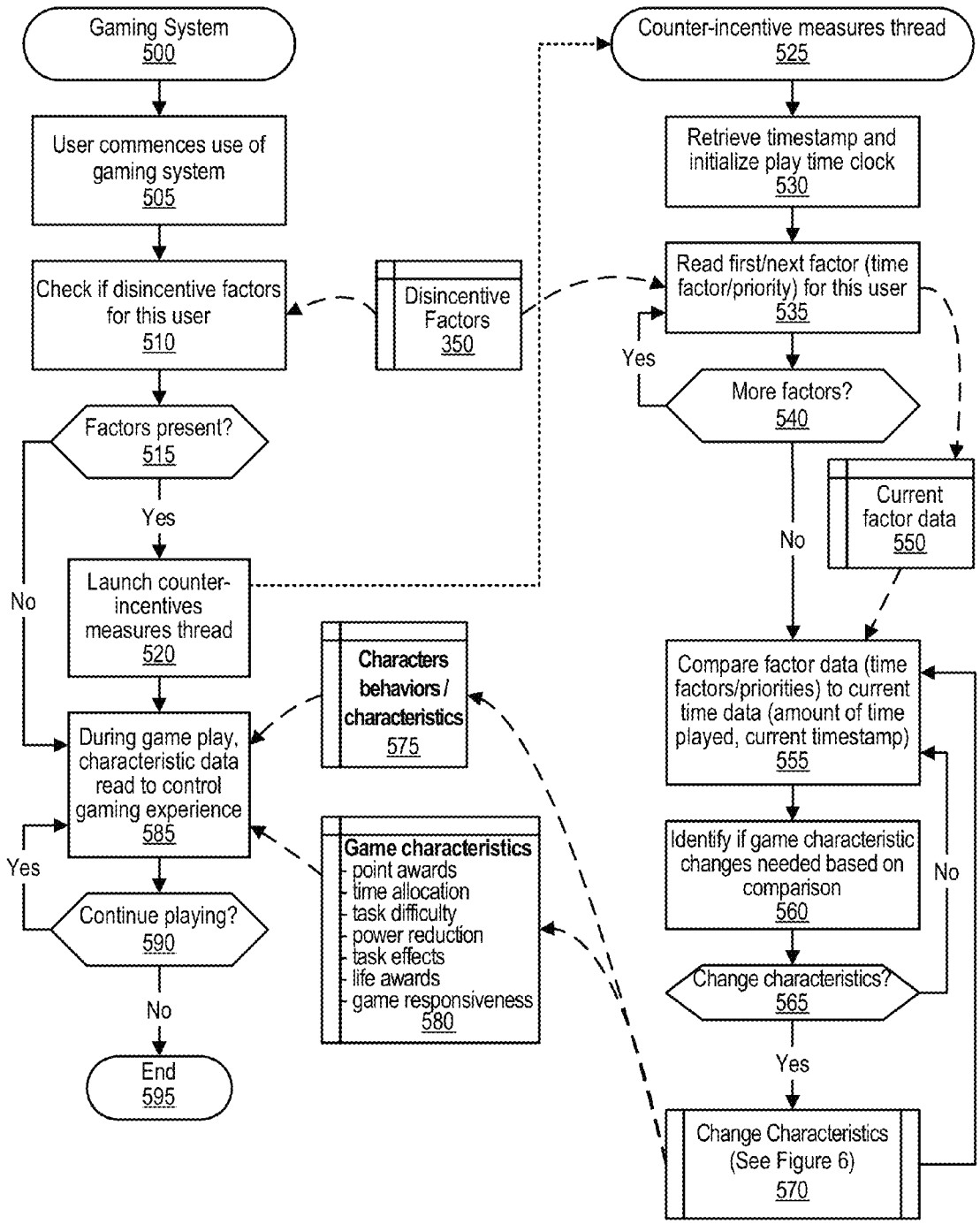
FIG. 5 is a flowchart showing steps taken by the video game system and counter-incentive process to provide game disincentives.

FIG. 5 is a flowchart showing steps taken by the video game system and counter-incentive process to provide game disincentives. Game system processing commences at 500 whereupon, at step 505, the user commences use of the gaming system. At step 510, the gaming system reads disincentive factors memory area 350 to identify any disincentive factors that may have been established for the current user of the gaming system. A decision is made as to whether any disincentive factors are established for the current user (decision 515). If disincentive factors have been established, then gaming system processing branches to the "yes" branch whereupon, at step 520, the gaming system launches counter-incentives measures threads.

Turning to counter-incentives processing, processing commences at 525 whereupon, at step 530, the counter-incentive measures threads retrieve the current timestamp and initialize a clock that tracks the amount of time that the current user has played the video game. At step 535, the counter-incentives process retrieves the first factor corresponding to the current user from disincentive factors memory area 350 and stores the retrieved factor in current disincentive factors 550. A decision is made as to whether there are more disincentive factors corresponding to the current user (decision 540). If there are more factors, then decision 540 branches to the "yes" branch whereupon the process loops back to retrieve the next disincentive factor that corresponds to the current user. This looping continues until all of the disincentive factors corresponding to the current user have been processed, at which point the process branches to the "no" branch for further disincentive processing.

At step 555, the counter-incentive measures thread compares factor data previously established for the current user with current time data. Factor data corresponding to the user may include time factors allowed before disincentives are applied as well as priorities that are used to calculate a particular disincentive. Current time data includes time of day information (day of the week, weekday, weekend, time of day, amount of time played, etc.). At step 560, the process identifies whether a disincentive is to be applied based on the comparison performed at step 555. A decision is made as to whether to change the game characteristics by applying a disincentive (decision 565). If a change, or alteration, is not needed then decision 565 branches to the "no" branch which loops back to continue monitoring the factor data corresponding to the user with current time data. This looping continues until a change (alteration) to the game characteristics is needed in order to apply a disincentive, at which point decision 565 branches to the "yes" branch whereupon predefined process 570 is performed to change the game characteristics and apply a disincentive (see FIG. 6 and corresponding text for processing details). Processing then loops back to step 555 to continue monitoring the factor data with current time data in order to identify whether further disincentives are needed.

Figure 6:
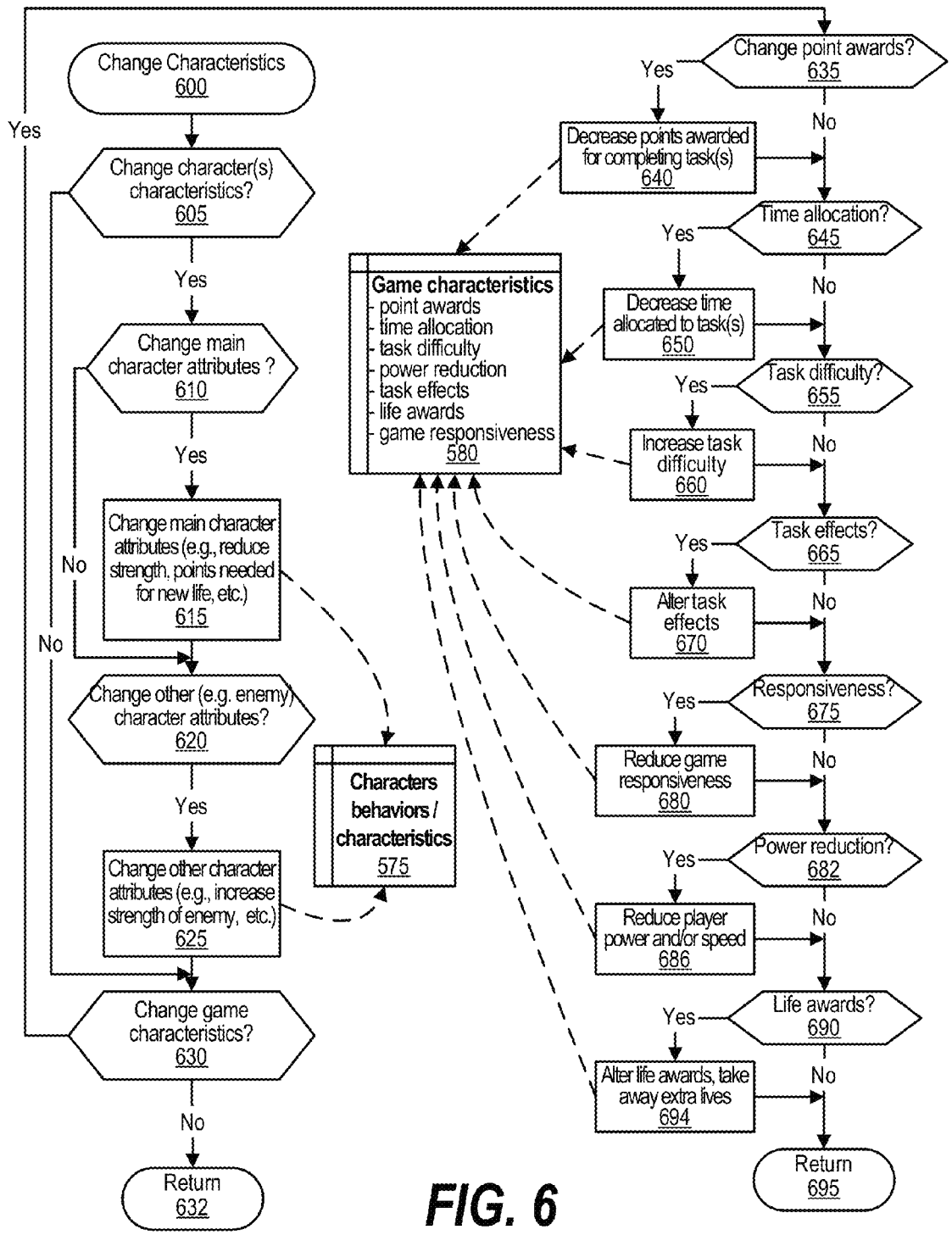
FIG. 6 is a flowchart showing steps taken by the counter-incentive process in changing video game characteristics.

FIG. 6 is a flowchart showing steps taken by the counter-incentive process in changing video game characteristics. Processing performed to alter the video game characteristics commences and provide a disincentive (or further disincentive) to the user commences at 600. A decision is made as to whether an alteration of character characteristics is to be performed (decision 605). The character attributes correspond to a character of the video game and run counter (are negative) to the character's normal character attributes. If a change is needed to character attributes, then decision 605 branches to the "yes" branch whereupon a decision is made as to whether a change is made to one or more of the main character's attributes (decision 610). If a change to attributes corresponding to a main character(s) attribute(s) is being made, then decision 610 branches to the "yes" branch whereupon, at step 615, the character attributes are changed. In addition, the priority established by the user can be utilized to determine the extent of the change. For example, for a high priority factor, the character's attributes (e.g., strength, speed, etc.) may be altered dramatically while for a lower priority factor the attributes may be altered less dramatically. In addition, the attributes may continue to be altered over time so that, for example, the character would have less and less strength, speed, etc. the longer the user plays past the established time factor. The changes to the character's attributes are stored in character characteristics data store 575 which is used by the video game system. For example, for a character where strength is important, the strength of the character is reduced while, for a character where speed is important, the speed of the character is reduced, etc. If a change is not being made to a main character attribute, then decision 610 branches to the "no" branch bypassing step 615.

A decision is made as to whether another type of character's attributes are being altered (decision 620), such as an enemy that opposes a character controlled by the user of the video system. If a change to another type of character's attributes are being made, then decision 620 branches to the "yes" branch whereupon, at step 625, the process changes another type of character's attributes and stores the changed attributes in character characteristics data store 575. For example, enemy characters that fight the main character may receive increased speed and/or strength making it more difficult for the user to successfully encounter such enemy characters providing a disincentive to the user to continue playing the game. Similar to the character attributes, the priority established by the user can be utilized to determine the extent of the change. For example, for a high priority factor, the character's attributes (e.g., strength, speed, etc.) may be altered dramatically while for a lower priority factor the attributes may be altered less dramatically. In addition, the attributes may continue to be altered over time so that, for example, the enemy would have greater strength, speed, etc. the longer the user plays past the established time factor. Returning to decision 605, if a change to character characteristics is not being performed, then decision 605 branches to the "no" branch bypassing steps 605 through 625.

A decision is made as to whether other characteristics of the video game are being altered to provide disincentives (decision 630). If other characteristics of the video game are not being altered to provide disincentives, then decision 630 branches to the "no" branch whereupon processing returns to the calling routine (see FIG. 5) at 632. On the other hand, if other characteristics of the video game are being altered to provide disincentives, then decision 630 branches to the "yes" branch for further disincentive processing.

A decision is made by the process as to whether to change the algorithm that awards points (e.g., high game points, etc.) to the user during game play (decision 635). If the algorithm that awards points is being changed, then decision 635 branches to the "yes" branch whereupon, at step 640 the point awards algorithm is changed so that the amount of points awarded for the user completing a game task are decreased. Further disincentives can be provided by having the overall game points actually decrease as the user continues playing the video game beyond the set time factor. The changed award algorithm is stored in game characteristics 580 which is utilized during game play. Returning to decision 635, if the points award algorithm is not being changed, then decision 635 branches to the "no" branch bypassing step 640.

A decision is made by the process as to whether to change the time that is allocated in the game for the user to perform various game tasks, such as completing a level, obtaining an object, etc. (decision 645). If the time allocated for task completion is being altered, then decision 645 branches to the "yes" branch whereupon, at step 650, the process decreases the amount of time allowed to complete various tasks. Further disincentives can be provided by having the time allocated for various tasks decrease even further as the user continues playing the video game beyond the set time factor making it more difficult and frustrating for the user to play the video game. The altered time allocations to complete the various tasks are stored in game characteristics 580 which is utilized during game play. Returning to decision 645, if the time allocated to complete various tasks is not being changed, then decision 645 branches to the "no" branch bypassing step 650.

A decision is made by the process as to whether to change the difficulty to perform various game tasks by the user, such as a task involving dexterity, timing, coordination, or the like (decision 655). For example, if an object normally has to be hit by a video game character five times to complete a task, the number of required hits may increase to ten hits and then later to twenty hits in order to complete the same task. If task difficulty is being altered, then decision 655 branches to the "yes" branch whereupon, at step 660, the process increases the difficulty level to complete the various tasks. Further disincentives can be provided by having the difficulty level further increased to complete the various tasks as the user continues playing the video game beyond the set time factor making it more difficult and frustrating for the user to play the video game. The altered difficulty levels to complete the various tasks are stored in game characteristics 580 which is utilized during game play. Returning to decision 655, if the task difficulties are not being changed, then decision 655 branches to the "no" branch bypassing step 660.

A decision is made by the process as to whether to change tasks effects corresponding to tasks performed by the user (decision 665). If task effects are being altered, then decision 665 branches to the "yes" branch whereupon, at step 670, the process changes various task effects when a task is performed by a user. Further disincentives can be provided by having the task effects further changed as the user continues playing the video game beyond the set time factor making it more difficult and frustrating for the user to play the video game. For example, if encountering a particular object provides the user with "super" powers, the task effect could be that encountering the object no longer bestows "super" powers upon the user's video game character. Further play by the user could further change the task effect—for example making the object harmful to the user's video game character rather than helpful. The altered task effects are stored in game characteristics 580 which is utilized during game play. Returning to decision 665, if the task difficulties are not being changed, then decision 665 branches to the "no" branch bypassing step 670.

A decision is made by the process as to whether to change game responsiveness (decision 675). If game responsiveness is being altered, then decision 675 branches to the "yes" branch whereupon, at step 680, the responsiveness of the game is altered (reduced). For example, the responsiveness of a game controller may be altered making it more difficult for the user to control the movement of video game characters. Further disincentives can be provided by having the game responsiveness further reduced as the user continues playing the video game beyond the set time factor making it more difficult and more frustrating for the user to play the video game. For example, further play by the user could result in extremely unresponsive controls making it exceedingly difficult for the user to control the video game characters resulting in unwanted game consequences for the user. The altered (reduced) game responsiveness values are stored in game characteristics 580 which is utilized during game play.

Returning to decision 675, if the game responsiveness is not being changed, then decision 675 branches to the "no" branch bypassing step 680.

A decision is made by the process as to whether to change player power and/or speed (decision 682). If player power and/or speed being altered, then decision 682 branches to the "yes" branch whereupon, at step 686, the user's power and/or speed is altered (reduced). For example, in a "first person shooter" (FPS) style video game, the user's ability to run, turn, and otherwise move the first-person aspects displayed on the display screen may be reduced (slowed) making the user more vulnerable to attack by enemies. In addition, strikes or attacks by the user on video game characters may be reduced making it more difficult for the user to defeat enemy characters or defend the user's video game persona. Further disincentives can be provided by having the speed and/or strength further reduced as the user continues playing the video game beyond the set time factor making it more difficult and more frustrating for the user to play the video game. The altered (reduced) power and/or strength are stored in game characteristics 580 which is utilized during game play. Returning to decision 682, if the player (user) power and/or strength are not being changed, then decision 682 branches to the "no" branch bypassing step 686.

A decision is made by the process as to whether to change life awards awarded to the user during game play (decision 690). If life awards are being altered, then decision 690 branches to the "yes" branch whereupon, at step 694, the life awards normally bestowed upon the user for earning points or completing tasks is reduced. For example, when a level is completed the video game system may award the user an additional virtual life that can be used when the user's video game character is destroyed or defeated. When the disincentive is applied, the user may have to complete two or three levels to earn a life award or may not receive any further life awards. Further disincentives can be provided by having the life awards actually be reduced, rather than increased, as the user continues playing the video game beyond the set time factor making it more difficult and more frustrating for the user to play the video game. For example, if the user has earned three life awards and completes a level, rather than earning an additional (fourth) life award, the life awards may be reduced so that the user only has two life awards. The altered (reduced) life awards are stored in game characteristics 580 which is utilized during game play. Returning to decision 690, if the life awards are not being changed, then decision 690 branches to the "no" branch bypassing step 694.

After the disincentives are calculated and applied to character characteristics data store 575 and game characteristics data store 580, processing returns to the calling routine (see FIG. 5) at 695. Data stores 575 and 580, having been altered to provide game playing disincentives, are then retrieved and utilized by the video game system providing increased disincentives to the user and encouraging the user to terminate the current game playing session and resume at some time in the future allowing the user time to complete employment, school, or other tasks and responsibilities.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    executing a video game program by one or more processors, wherein the video game program is operated by a current user, and wherein the video game program includes a plurality of video game rules, and wherein the video game program includes a character, the character associated with one or more character attributes, the character attributes selected from the group consisting of character strength and character speed;
    altering one or more of the character attributes based on one or more of the video game rules;
    identifying one or more disincentive factors corresponding to the current user;
    comparing one of the identified disincentive factors with one or more current time factors; and
    further altering one or more of the character attributes based on the comparison, wherein the further altered character attributes provide a disincentive to continued operation of the video game program by the current user.

2. The method of claim 1 wherein the further altered character attributes are counter to one or more normal character attributes.

3. The method of claim 1 further comprising:
    changing a game points award algorithm based on the comparison, wherein the changed game points award algorithm decreases points awarded when the current user completes one or more game tasks included in the video game program.

4. The method of claim 1 further comprising:
decreasing a task time allocation setting based on the comparison, wherein the task time allocation setting controls an amount of time permitted to complete one or more game tasks included in the video game program.

5. The method of claim 1 further comprising:
increasing a task difficulty setting based on the comparison, wherein the task difficulty setting controls a difficulty to perform one or more game tasks included in the video game program.

6. The method of claim 1 further comprising:
reducing a responsiveness setting based on the comparison, wherein the responsiveness setting corresponds to a game controller manipulated by the user to control one or more objects of the video game program that are displayed on a display screen.

7. The method of claim 1 wherein the further altering one or more character attributes further comprises:
decreasing a life vitality setting used by the video game program to provide virtual life to the character included in the video game program.

8. An information handling system comprising:
one or more processors;
a memory coupled to at least one of the processors;
a display screen accessible by at least one of the processors;
a set of instructions stored in the memory and executed by at least one of the processors in order to perform actions of:
executing a video game program by one or more processors, wherein the video game program is operated by a current user, and wherein the video game program includes a plurality of video game rules, and wherein the video game program includes a character, the character associated with one or more character attributes, the character attributes selected from the group consisting of character strength and character speed;
altering one or more of the character attributes based on one or more of the video game rules;
identifying one or more disincentive factors corresponding to the current user;
comparing one of the identified disincentive factors with one or more current time factors; and
further altering one or more of the character attributes based on the comparison, wherein the further altered character attributes provide a disincentive to continued operation of the video game program by the current user.

9. The information handling system of claim 8 wherein the further altered character attributes are counter to one or more normal character attributes.

10. The information handling system of claim 8 wherein the actions further comprise:
changing a game points award algorithm based on the comparison, wherein the changed game points award algorithm decreases points awarded when the current user completes one or more game tasks included in the video game program.

11. The information handling system of claim 8 wherein the actions further comprise:
decreasing a task time allocation setting based on the comparison, wherein the task time allocation setting controls an amount of time permitted to complete one or more game tasks included in the video game program.

12. The information handling system of claim 8 wherein the actions further comprise:
increasing a task difficulty setting based on the comparison, wherein the task difficulty setting controls a difficulty to perform one or more game tasks included in the video game program.

13. The information handling system of claim 8 wherein the information handling system further comprises a display screen accessible by at least one of the processors and wherein the actions further comprise:
reducing a responsiveness setting based on the comparison, wherein the responsiveness setting corresponds to a game controller manipulated by the user to control one or more objects of the video game program that are displayed on a display screen.

14. The information handling system of claim 8 wherein the further altering one or more character attributes includes additional actions comprising:
decreasing a life vitality setting used by the video game program to provide virtual life to one or more characters included in the video game program.

15. A computer program product stored in a non-transitory computer readable medium, comprising functional descriptive material that, when executed by an information handling system, causes the information handling system to perform actions that include:
executing a video game program, wherein the video game program is operated by a current user, and wherein the video game program includes a plurality of video game rules, and wherein the video game program includes a character, the character associated with one or more character attributes, the character attributes selected from the group consisting of character strength and character speed;
altering one or more of the character attributes based on one or more of the video game rules;
identifying one or more disincentive factors corresponding to the current user;
comparing one of the identified disincentive factors with one or more current time factors; and
further altering one or more character attributes based on the comparison, wherein the further altered character attributes provide a disincentive to continued operation of the video game program by the current user.

16. The computer program product of claim 15 wherein the further altered character attributes are counter to one or more normal character attributes.

17. The computer program product of claim 15 wherein the actions further comprise:
changing a game points award algorithm based on the comparison, wherein the changed game points award algorithm decreases points awarded when the current user completes one or more game tasks included in the video game program.

18. The computer program product of claim 15 wherein the actions further comprise:
decreasing a task time allocation setting based on the comparison, wherein the task time allocation setting controls an amount of time permitted to complete one or more game tasks included in the video game program.

19. The computer program product of claim 15 wherein the actions further comprise:
increasing a task difficulty setting based on the comparison, wherein the task difficulty setting controls a difficulty to perform one or more game tasks included in the video game program.

20. The computer program product of claim 15 wherein the actions further comprise:

reducing a responsiveness setting based on the comparison, wherein the responsiveness setting corresponds to a game controller manipulated by the user to control one or more objects of the video game program that are displayed on a display screen.

\* \* \* \* \*